United States Patent Office 3,035,076
Patented May 15, 1962

3,035,076
ANTIMONY DERIVATIVES
Paul Gailliot, Paris, François Debarre, Palaiseau, and André Cometti, Maisons Alfort, France, assignors to Societe des Usines Chimiques Rhone-Poulenc, Paris, France, a French body corporate
No Drawing. Filed July 25, 1960, Ser. No. 44,853
Claims priority, application Great Britain July 31, 1959
4 Claims. (Cl. 260—446)

This invention relates to a new class of antimony derivatives which have been found to be of use as therapeutic agents, and to therapeutic compositions containing the same.

According to a first feature of the present invention there are provided new antimony derivatives of the general formula:

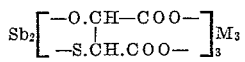

wherein M represents two hydrogen or alkali metal atoms or an atom of an alkaline earth metal. Where M represents two hydrogen atoms the derivative is of the formula

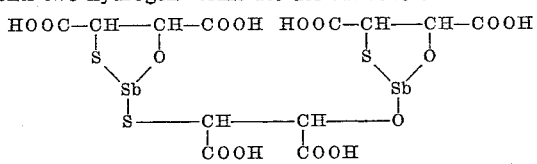

The systematic name of this acid is 2-oxy(4,5-dicarboxy-1 - oxa - 3 - thia - 2 - stib - 2 - olanyl) - 3 - thio(4,5 - dicarboxy-1-oxa-3-thia-2-stib-2-olanyl)-succinic acid. It has been found that the aforesaid compounds possess valuable therapeutic properties, in particular in the treatment of bilharziasis.

According to a further feature of the invention antimony derivatives of the foregoing general formula are prepared by reacting 2-mercapto-3-hydroxysuccinic acid, as such or as an alkali metal or alkaline earth metal salt thereof, with a trivalent antimony derivative.

The alkali metal or alkaline earth metal salt of 2-mercapto-3-hydroxysuccinic acid may be prepared by reaction of 2-mercapto-3-hydroxysuccinic acid with an hydroxide, carbonate or bicarbonate of an alkali metal or of an alkaline earth metal, preferably in an aqueous or organic liquid medium. The preferred salt for use is the lithium salt of 2-mercapto-3-hydroxysuccinic acid.

The trivalent antimony derivative may be an antimony salt such as an antimony halide or antimonious oxide ($Sb_2O_3$) or an organo-antimony complex. The preferred trivalent antimony derivatives for the use in the process of this invention are the salts of the acid formed from antimonious oxide.

The reaction to form the antimony derivatives of the present invention is preferably effected in a liquid medium and the product then isolated by any conventional techniques, e.g. evaporation of the liquid medium, or precipitation and filtration.

Because of the presence of two asymmetric carbon atoms in its molecule, 2-mercapto-3-hydroxysuccinic acid can exist in two stereoisomeric forms, threo and erythro. These two forms can be prepared by the action of potassium thiosulphate upon an epoxysuccinic acid. It is presumed, by analog with other comparable cases, that trans-epoxysuccinic acid produces the erythro form, while cis-epoxysuccinic acid produces the threo form. Erythro-2-mercapto-3-hydroxysuccinic acid, M.P. 142–144° C., has already been described (H. Hauptmann and M. Berl, Résumé of Communications to the Sixteenth International Congress of Pure and Applied Chemistry, Paris, July 1957, volume 2, page 140). Threo-2-mercapto-3-hydroxysuccinic acid, M.P. 112° C., does not appear to have been hitherto described.

On reaction with the trivalent antimony derivatives, the stereoisomeric 2-mercapto-3-hydroxysuccinic acids or their salts give products possessing different infra-red spectra according to whether the threo form or the erythro form of the acid is used as starting material. Derivatives prepared from erythro-2-mercapto-3-hydroxysuccinic acid or its salts will be hereinafter referred to as antimoniomercaptohydroxysuccinic (form A) derivatives and those obtained from threo-2-mercapto-3-hydroxysuccinic acid or its salts will be hereinafter referred to as antimoniomercaptohydroxysuccinic (form B) derivatives. The infra-red spectra were determined with tablets containing the product to be studied (2 mg.) and potassium bromide (400 mg.).

The new antimony derivatives of both form A and form B are therapeutically active but the derivatives of form A are preferred as having a superior activity in many cases.

The following examples will serve to illustrate the invention.

*Example I*

To a solution of erythro-2-mercapto-3-hydroxysuccinic acid (10 g.), M.P. 142–144° C., in water (5 cc.) is added over 10 minutes a 3.16 N aqueous solution (38 cc.) of lithium hydroxide, with external cooling in a bath of ice-water.

A solution of antimony trichloride (9.13 g.) in chloroform (40 cc.) and a 3.16 N aqueous solution (38 cc.) of lithium hydroxide are then run in simultaneously over 20 minutes, the temperature being kept below 5° C.

Agitation is continued for 2 hours in the cold and, after filtration, the filtrate is run into ethanol (1,300 cc.) with agitation and external cooling in an ice-bath. The precipitate is separated, washed with ethanol (100 cc.) and dried at 35° C. under a pressure of 0.1 mm. Hg. Lithium antimoniomercaptohydroxysuccinate (form A) (16.5 g.) is obtained, having the empirical formula $C_{12}H_6O_{15}S_3Sb_2Li_6.10H_2O$

*Example II*

Proceeding as in Example I, but using threo-2-mercapto-3-hydroxysuccinic acid, M.P. 112° C. (10 g.), lithium antimoniomercaptohydroxysuccinate (form B) (16.1 g.), of empirical formula $C_{12}H_6O_{15}S_3Sb_2Li_6.7H_2O$ is obtained.

*Example III*

Finely powdered antimonious oxide ($Sb_2O_3$) (25 g.) is added to a solution of erythro-2-mercapto-3-hydroxysuccinic acid (28.5 g.) in water (86 cc.), and heated at 45–50° C. for 3 hours with vigorous agitation. After cooling, the insoluble matter is filtered off and the filtrate neutralized by the addition of lithium carbonate (8.3 g.). The solution obtained is treated with decolourising charcoal (0.2 g.), filtered and evaporated to dryness in vacuo. Lithium antimoniomercaptohydroxysuccinate (form A) (45.2 g.) is obtained.

*Example IV*

Finely powdered antimonious oxide ($Sb_2O_3$) (3.62 g.) is added to a solution of erythro-2-mercapto-3-hydroxysuccinic acid (4.15 g.) in water (25 cc.). The mixture is heated at 40–45° C. for 3 hours and the insoluble matter filtered off and washed with water (3 x 2 cc.). The filtrate is decolourised by the addition of decolourising charcoal (0.1 g.) and the clear solution obtained is evaporated to a volume of about 10 cc. After standing for 16 hours at 5° C., the precipitate is filtered off, washed with water (2 cc.), and dried at 25° C. under a pressure of 0.1 mm. Hg. Antimoniomercaptohydroxysuccinic acid (form A) (2.95 g.) is obtained.

According to a further feature of the present invention there are provided pharmaceutical compositions comprising one or more antimony derivatives of the invention in association with a pharmaceutical carrier and optionally with other therapeutically active compounds. These compositions may be formulated for oral administration but are preferably sterile injectable compositions for parenteral administration.

Preparations for oral administration may be in the form of tablets, pills, dispersible powders or granules, solutions, emulsions, suspensions or syrups. The most usual ingredients associated with the active products in solid compositions include calcium carbonate, starch, alginic acid, lactose, and magnesium stearate, while for liquid preparations for oral administration, liquids customarily utilised in pharmaceutical practice may be used, e.g. flavoured syrups.

Preparations for parenteral administration include sterile aqueous and non-aqueous solutions, suspensions and emulsions. Non-aqueous injectable liquids that can be include, more particularly, propylene glycol, vegetable oils such as olive oil, and esters such as ethyl oleate. These preparations are sterilised by any suitable means; for example by filtration through a sterilising filter, by addition of sterilising agents or by irradiation. The injectable compositions may also be prepared as they are required for clinical use by mixing an appropriate sterile liquid vehicle with solid sterile antimony derivative under sterile conditions. This last method is generally the most convenient, and, when it is used, the dry sterile antimony derivative in amount suitable for one injection is conveniently confined in a sealed sterile ampoule which is broken open and the contents dissolved in sterile pyrogen-free water immediately before use.

The percentage of active product in the pharmaceutical preparations may be varied between wide limits according to the conditions of use and the frequency of administration. A quantity of active product between 10 and 60 mg. may be administered daily by intramuscular injection.

We claim:
1. A compound selected from the class consisting of the planar formula

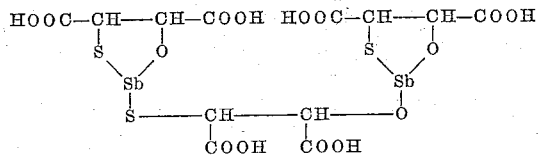

and its alkali metal and alkaline earth metal salts.

2. The compound of the formula

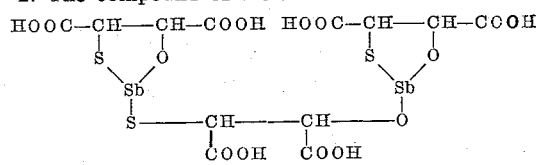

in erythro form.

3. The lithium decahydrate salt of the acid defined in claim 1, in erythro form.

4. The lithium heptahydrate salt of the acid defined in claim 1 in threo form.

References Cited in the file of this patent
UNITED STATES PATENTS

| | | |
|---|---|---|
| 1,555,663 | Hahl | Sept. 29, 1925 |
| 1,688,964 | Hahl | Oct. 23, 1928 |
| 2,060,181 | Delepine et al. | Nov. 10, 1936 |
| 2,480,823 | Morris et al. | Sept. 6, 1949 |